United States Patent [19]

Luongo

[11] 3,782,113

[45] Jan. 1, 1974

[54] ELECTRIC POWER PLANT SYSTEM AND METHOD FOR OPERATING A STEAM TURBINE ESPECIALLY OF THE NUCLEAR TYPE WITH ELECTRONIC REHEAT CONTROL OF A CYCLE STEAM REHEATER

[75] Inventor: Michael C. Luongo, Brookhaven, Pa.

[73] Assignee: Westinghouse Electric Corporation, Pittsburgh, Pa.

[22] Filed: Jan. 27, 1972

[21] Appl. No.: 221,185

[52] U.S. Cl............................ 60/73, 290/40, 60/105
[51] Int. Cl................................................. F01k 7/16
[58] Field of Search........................... 60/70, 73, 105

[56] References Cited
UNITED STATES PATENTS

| | | | |
|---|---|---|---|
| 3,097,490 | 7/1963 | Callan et al............................ | 60/105 |
| 3,511,051 | 5/1970 | Mitchell................................. | 60/105 |
| 3,552,872 | 1/1971 | Giras et al. ........................... | 235/151 |
| 3,561,216 | 2/1971 | Moore, Jr. .............................. | 60/73 |
| 3,630,839 | 12/1971 | Podolsky................................ | 60/73 |

Primary Examiner—Martin P. Schwadron
Assistant Examiner—Harold Burks
Attorney—F. H. Henson et al.

[57] ABSTRACT

An electronic system is provided for operating a nuclear electric power plant with electronic steam reheating control applied to the nuclear turbine system in response to low pressure turbine temperatures, and the control is adapted to operate in a plurality of different automatic control modes to control reheating steam flow and other steam conditions, each of such modes of control permitting turbine temperature variations within predetermined constraints and according to predetermined functions of time.

38 Claims, 6 Drawing Figures

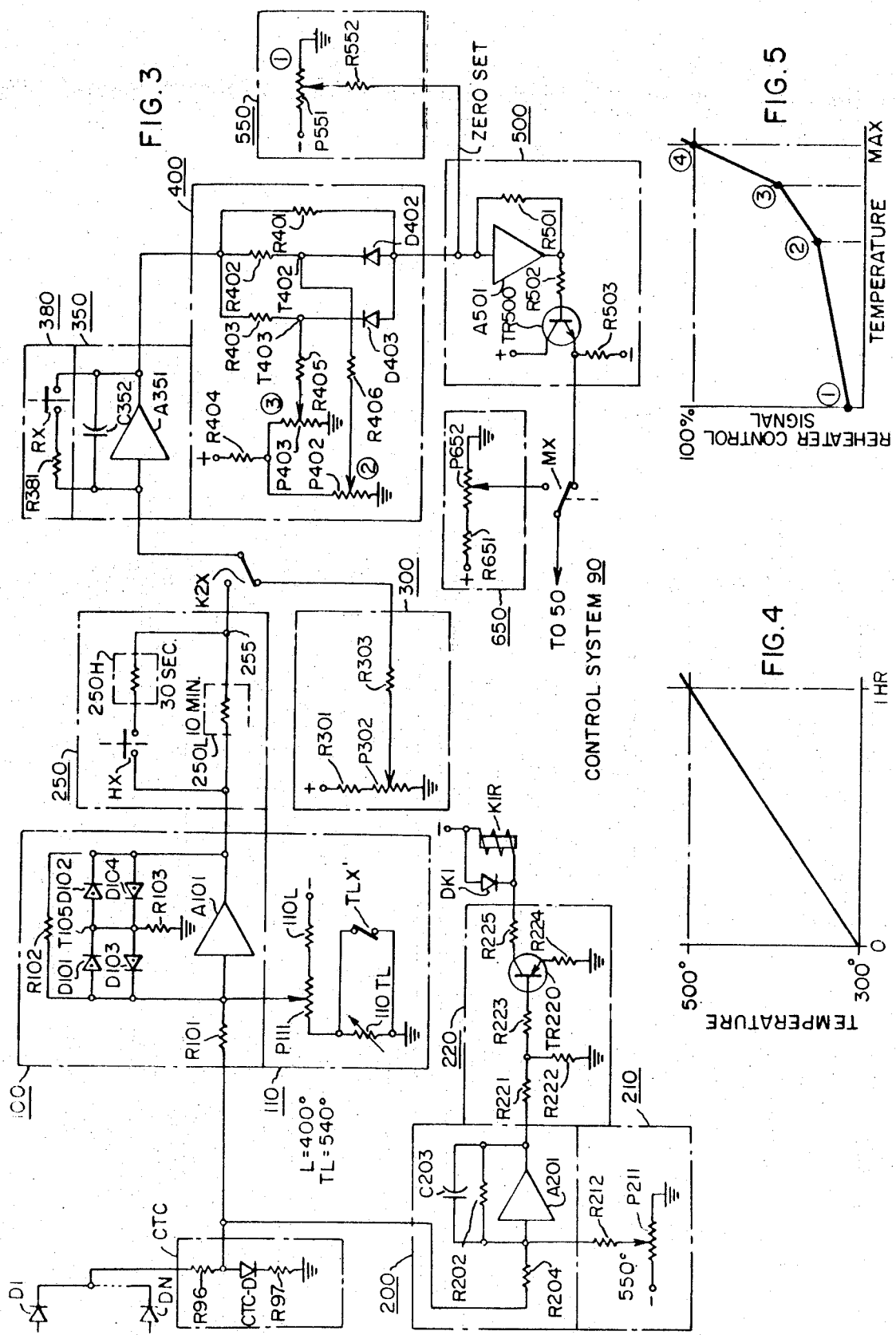

ELECTRIC POWER PLANT SYSTEM AND METHOD FOR OPERATING A STEAM TURBINE ESPECIALLY OF THE NUCLEAR TYPE WITH ELECTRONIC REHEAT CONTROL OF A CYCLE STEAM REHEATER

CROSS REFERENCE TO RELATED APPLICATIONS

Ser. No. 233,076 filed March 9, 1972 entitled "Electric Power Plant System and Method for Operating a Steam Turbine Especially of the Nuclear Type Preferably with Electronic Reheat Control and an Electronic Reheater" by M. C. Luongo et al.

BACKGROUND OF THE INVENTION

This invention lies in the field of electric power plants and, more particularly, automatic control systems for continuously and automatically controlling the steam reheating operation in a nuclear turbine system.

A characteristic of nuclear steam generators utilized in the production of electric power is that the steam produced therefrom is of a generally lower temperature than that of steam generators powered by non-nuclear or fossil fuel sources, such that the generated steam is substantially at a saturation temperature containing not much more energy than that required to evaporate water. Consequently, as soon as a relatively small amount of energy is taken out of the steam by the developments of turbine drive in a high pressure turbine section, moisture forms in it which would otherwise make the steam unusable for further driving of the turbine. For example, in nuclear turbine operation the steam being exhausted from the high pressure turbine section enters the saturated (wet) condition at approximately 35 percent of rated turbine load, due to the energy which is being taken out of the steam. Yet, the same steam is needed for use in developing turbine drive in one or more lower pressure sections of the turbine system. Further, it is extremely important to prevent excessive temperature of the lower pressure steam as well as conditions of rapidly heating cold turbine parts as in the case of a cold start, overheating and overstressing of low pressure turbine exhaust parts as in the case of low load operation, and rapid cooling of the lower pressure turbine section (hereinafter referred to as the low pressure turbine section) in the case of a hot start. In one specific turbine system design, the maximum instantaneous temperature change of the steam to the LP turbine inlet must be limited to 100°F due to thermal stress and possible distortions of the low pressure (LP) turbine stationary parts. Except for such an instantaneous steam temperature change, the rate of change of this temperature must not exceed 250°F per hour in order to avoid excessive distortion of fatigue cracking of the turbine parts.

Generally, in nuclear power plants, the steam reheat function is normally performed outside the primary steam generator as opposed to the case of fossil plants where reheat is typically performed inside the primary steam generator. Since the nuclear reheater steam temperature may be considerably different from the LP section inlet steam temperature, both the difference between the two steam temperatures and the rate at which that difference changes may require control since large temperature differences can cause excessive low pressure turbine section stresses.

Although varying systems specifications are possible, a typical control specification for starting a nuclear turbine system provides that no reheat steam is to be passed through the reheater until the plant has been brought up to 35 percent of full load as measured in terms of pressure or electric power delivered (megawatts). Such a control specification is designed to decrease the temperature differential between the reheat steam temperature and the low pressure section inlet to about 100° before beginning the opening of the reheater control valve which determines the flow of reheat steam. Under these conditions experience has shown that a suitable rate of reheater valve opening provides for a gradual increase in opening from 0 to 100 percent over a period of one hour.

Once the system has been brought to a full reheat steam mode of operation it may be maintained there as long as the actual load remains above 10 percent of full load. This operating condition has been found to be permissible because the temperature differential under such conditions between the reheat steam and the low pressure section inlet temperature is not sufficiently great to cause excessive turbine stresses. If the load should drop to below 10 percent of full load or less it becomes necessary to reduce the steam temperature at the low pressure section inlet, particularly to protect against overheating of the last row of rotating blades of the low pressure section.

During low load conditions (10 percent or less of full load), there is a very low flow of cycle or motive steam. The last row of blades in a low-pressure turbine section do not work, that is, there is substantially no expansion of steam through these blades and they act more or less as compressors or pumps and simply windmill around in a steam atmosphere. As a consequence, these blades start to heat up considerably, causing another condition where these blades may be overheated. Accordingly, a typical specification for a nuclear steam turbine system includes the provision that the inlet steam temperature at the low pressure section must be brought down below a low load limit (such as 400°F) within 15 minutes of the first occurrence of a load drop below the 10 percent of full-load level.

The so-called low load situation (load has dropped below 10 percent of full load) may occur for example during a blackout where all of the outside load with respect to the plant has been lost and it is then desired only to run the pumps within the station or other facilities of that type.

Another case where low pressure inlet steam temperature regulation becomes critical is where the turbine unit is being hot. In this case the control must prevent possible rapid cooling of the metal in that section during the startup process. This type of operation is referred to as "hot start" and the control in this case must permit the rapid opening of the reheater steam valve to avoid excessive cooling of the turbine parts.

Summarizing then, the three basic temperature controls which are necessary in a nuclear steam turbine system or any system where a separate heat transfer unit is utilized for reheating are: (1) reheat steam temperature rate of increase control during cold start to regulate the absolute value of the steam and structural temperature at the low pressure section inlet and the rate at which these absolute values are permitted to change; (2) temperature regulation of the inlet temperature and low pressure turbine end temperature below a maximum temperature unit during low load operation; (3) a hot start mode of operation where it is necessary to prevent excessive cooling of the low pressure turbine.

In addition to the above specification, certain other control specifications must be met in a system of the type described above. These specifications may be summarized as follows: (1) provision must be made to protect the system from excessive absolute reheat temperature at the inlet of the low pressure section in the order, for example, of 540° or higher; (2) provision must be made to permit the resetting of the reheat steam flow control to permit, for example, a new cold start operation; and (3) provision must be made to permit a human operator to override the automatic control apparatus.

To enable downstream motive use of the wet stream it is standard practice in designing nuclear turbine systems to incorporate separate moisture separator-reheater apparatus to control the moisture content of the steam which is cycled from the high pressure turbine section to the low pressure turbine section. One example of said apparatus is disclosed in copending application Ser. No. 763,885 now U.S. Pat. No. 3,574,303, assigned to the present assignee, entitled "Moisture Separator Reheater for Pressurized Vapor" and filed by T. J. Rabis on Sept. 30, 1968.

A reheater control valve is normally used to regulate the amount and rate of steam temperature increase of the turbine cycle steam passing through the reheater. The regulation of such cycle steam may be accomplished by opening and closing the reheater control valve, thus controlling the amount of heating steam passing through the reheater tubes, and accordingly the amount of heat which is transferred to the turbine cycle steam, temperature is increased, and vice versa.

A commercially supplied prior art turbine control scheme is shown and described more specifically in a printed paper entitled "Electrohydraulic Control for Improved Availability and Operation of Large Steam Turbines" presented by M. Birnbaum and E. G. Noyes to the ASME-IEEE National Power Conference at Albany, New York during September 19–23, 1965. In that scheme, feedback control is employed to regulate turbine speed and load in large electric utility steam turbines. Some digital circuitry is included especially a solid state digital reference system which eliminated earlier speed/load changer motor systems for establishing the turbine speed and load setpoint changes on a permissive ramp scheduled basis. An article entitled "Automatic Electronic Control of Steam Turbines According to a Fixed Programme" in the March 1964 issue of the Brown Boveri Review relates to similar subject matter.

Another prior art apparatus is described in Eggenberger et al, U.S. Pat. No. 3,098,176, issued July 16, 1963, entitled "Electric Long Range Speed Governor" and in Eggenberger et al, U.S. Pat. No. 3,097,488, issued July 16, 1963 entitled "Turbine Control System."

In the prior art, reheater control apparatus typically has consisted of a motor-operated cam adapted to send an error signal to a pneumatically operated control valve. However, such a system has been commercially unattractive because of size and bulkiness, incompatibility with other forms of equipment, and particularly because it requires excessive operating time.

More particularly, one type of prior art control has been referred to as a time-pattern transmitter and operates through the use of a motor-operated cam which in turn controls the transmission of an air signal to a reheater control valve. The so-called time-pattern transmitter is not fully automatic and still requires a considerable amount of the operator's time to insure that the various modes which have been specified are being properly executed. Although the cam control of air transmission is satisfactory at the turbine site it may not be permitted in some plants in the control room. Thus, the prior art system may not be conveniently interfaced by remote control with a turbine control system.

Another limitation of the referenced prior art approach has been the lack of automatic regulation control through the use of any feedback. This means that the operator has been required to adjust a cam in the case of low load control where it may be necessary to regulate to a temperature range in the region of 400°F. A further disability of the prior art system has been that the motor-operated cam system or time-pattern transmitter does not have logically-set modes which may be established remotely or otherwise by means of a programmed computer system or other automatic controller. This means that it has not been feasible in a practical sense to automatically switch from one mode to another through the use of the prior art. Thus, there has been a need in the electric power industry for a nuclear turbine operated by a control system which is capable of being miniaturized and mounted at any desired remote location, which is reliable and inexpensive, which can be efficiently tied into computer operation, which provides performance improvement in the steam reheat function, and which requires a minimum amount of operator time.

There is provided a method and apparatus for operating an electric power plant and nuclear type turbines therein with controlled steam reheating preferably according to a selected one of a plurality of modes of control operation. The apparatus preferably controls reheat steam conditions to provide variously for controlled linear increase of low pressure turbine temperature from a first LP turbine temperature to a second LP turbine temperature upon cold turbine start; controlled operation at a predetermined LP turbine temperature at low plant load; fast rise time increase of LP turbine temperature to a predetermined LP turbine temperature; and manual takeover by an operator. A mode control switching circuit functions with a computer or other means to enable operator selection of the desired mode of control. The system is automatically reset to a minimum LP turbine operating temperature when it is first turned on, and is automatically placed in temperature limiting mode of control, to the exclusion of all other modes, when the sensed LP turbine operating temperature exceeds a predetermined value. In the preferred embodiment, the sensed LP turbine temperature is that of stationary LP turbine structure near the LP inlet.

The control apparatus of this invention preferably includes control circuitry which provides a variable gain electric output coupled to an electropneumatic reheater valve transducer which in turn activates the reheater valves and accordingly controls the reheating applied to the steam being cycled from the high pressure turbine section to the low pressure turbine section(s). The inlet steam temperature(s) of the low pressure turbine section(s) is sensed and compared with a high temperature limit signal, with the system being automatically placed in a temperature limit control mode when the low pressure inlet steam temperature or the hottest of such values is sensed to have a temperature exceeding the high temperature limit.

BRIEF DESCRIPTION OF THE DRAWINGS

FIG. 3 shows a detailed circuit diagram of the control system shown in FIG. 2;

FIG. 4 shows a graph of an ideal variation of low pressure inlet steam temperature with time as produced in response to placing the control system in the cold start mode;

FIG. 5 shows a curve representing the relationship between a reheater control signal and the temperature of the reheated steam.

DESCRIPTION OF THE PREFERRED EMBODIMENT

Figure 1:
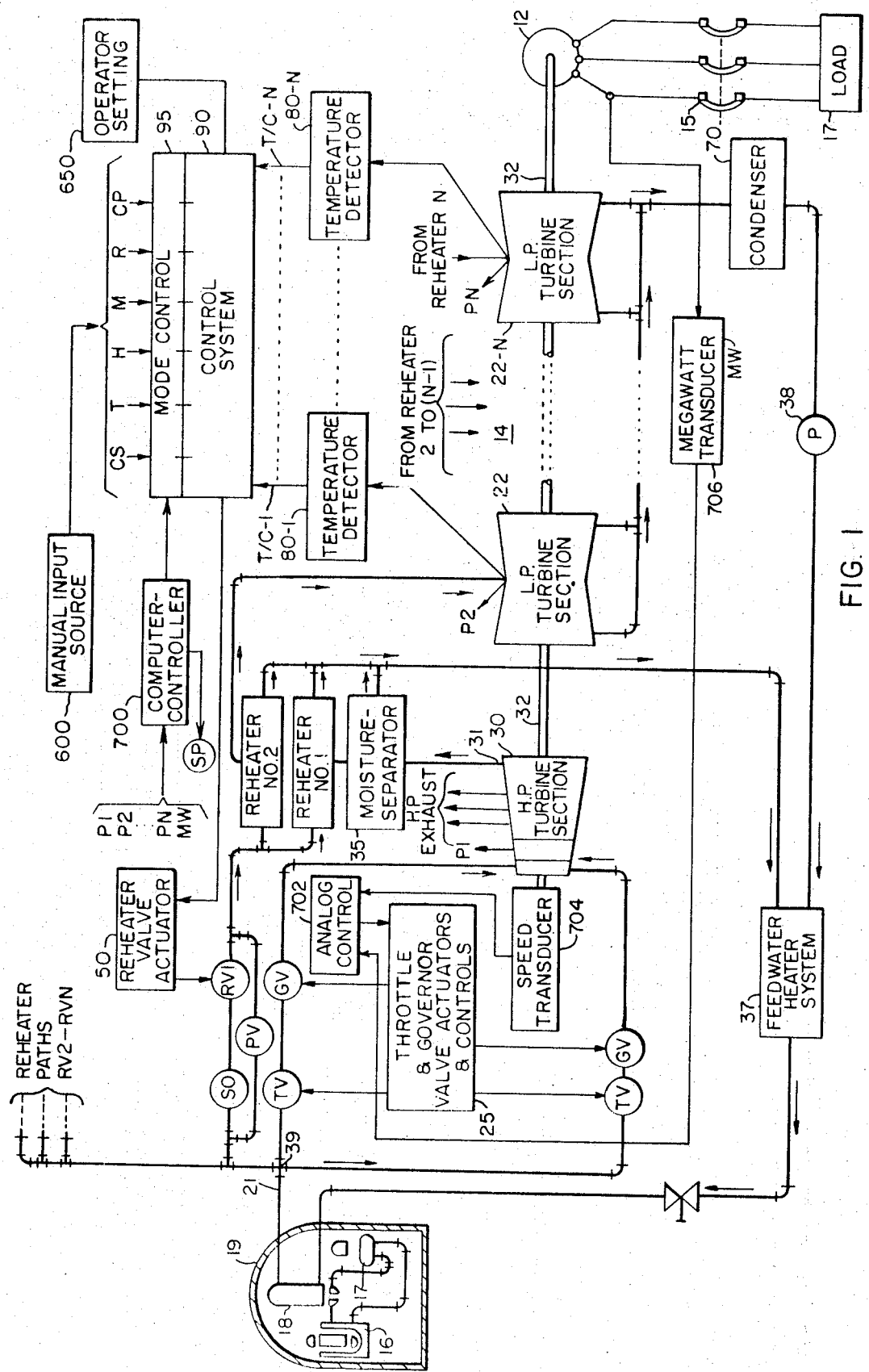
FIG. 1 shows a block diagram of an electric power plant including a nuclear turbine system operated in accordance with the principles of this invention.

With reference now to FIG. 1, the overall system of this invention is shown in block diagram form. A nuclear reactor 16, a pump 17, and a nuclear steam generator 18 are illustrated as located within a containment shell or vessel 19. By means well understood in the electric power plant art, the combination 16, 17, 18 provides for a transformer of nuclear energy to steam energy with the output of the nuclear steam generator 18 being a source of steam suitable for driving a nuclear turbine-generator system. Since the reactor 16 in this case is in the form of a pressurized water reactor, the steam output is generated in a secondary loop by heat transfer from the reactor coolant which flows in a primary loop. In other applications of the invention, the apparatus configurations employed to generate steam may vary, as would be the case, for example, if a boiling water reactor were employed.

As used in this disclosure, the term "nuclear turbine" refers to a turbine system driven by steam derived from the energy of a nuclear reactor. It is, of course, to be understood that any turbine system powered by relatively wet stream, from whatever source, would possess similar inherent characteristics to be classifiable as a nuclear type turbine, and accordingly, although the invention is especially adapted for and is especially useful with nuclear turbines in nuclear electric power plants, it can have applications in non-nuclear installations where "nuclear type" turbines are employed.

The hot main stream is carried from containment vessel 19 by main steam piping 21, to distribution point 39. From point 39, steam is carried through parallel paths. A first of such paths carries heating steam through the reheater valves, RV1-RVN. The other illustrated paths each carry steam through a throttle valve TV and governor valve GV, to a high pressure (HP) turbine section 30. The TV and GV valves may be actuated and controlled either manually from a computer controller unit 700, or as preferred in the present instance, from a conventional electronic analog electrohydraulic valve position control system 702.

The throttle and governor valves are operated to control the turbine speed during startup and the turbine load and frequency participation during synchronous operation. Such control can be implemented with conventional control loop arrangement. One example of prior art control suitable for the control 702 is that set forth in U.S. Pat. Nos. 3,097,488 and 3,098,176. A speed transducer 704 is coupled to a rotor shaft 32 thereby generating a signal which is proportional to turbine sections 22 and 30. The signal from the speed transducer 704 is fed into the analog system 702 and is utilized thereby for determining throttle value (TV) and governor value (GV) position. In the course of passing through the HP turbine section 30, the steam releases much of its energy to the turbine, and becomes relatively heavily laden with moisture. The steam from HP section 30 exits through a plurality of HP exhaust outlets, only one of which is shown in FIG. 1 (at 31).

The HP turbine element 30 is coupled through a rotor shaft 32 to a plurality of low pressure (LP) turbine sections 22. As indicated diagrammatically in FIG. 1, there may be any number of such low pressure sections coupled in tandem to drive the common shaft 32. Each LP turbine in the system is suitably a double flow turbine, and is thus considered to have two sections, or elements. As used in this specification, LP turbine section is defined to mean a low pressure turbine component receiving input steam downstream from the moisture-separator and reheater, and providing output power. The output power from all of the LP turbine sections, as well as that provided by the HP turbine section, is coupled through the shaft 32 to a conventional electric generator 12, which converts the rotational energy of the shaft to electrical energy. A breaker system 15 and a load 17 are connected to the generator 12. Thus, the entire system provides successive energy transformation from the nuclear fission energy in the reactor 16, to heat the steam in the steam generator 18, to kinetic energy at the turbines, and thence to electrical energy at the generator 12. The basic apparatus so far described forms a generally well known nuclear electric power plant and steam turbine installation which requires no further description on structural detail for a skilled artisan understanding of the invention and the manner in which the invention can be embodied with such apparatus.

A megawatt (MW) transducer 706 connected to an output of the generator 12 generates an output signal which is fed to the analog control 702 where the signal is utilized to determine GV and TV value positions.

The moisture laden steam exhausted from exhaust outlet 31 of the HP turbine section must be reconditioned before such steam is passed to any of the low pressure turbines. The reconditioning involves passing the steam through conventional moisture separator unit 35, where water is removed from the steam, placing it in a dry saturated state, and then through a conventional reheater unit 40, where the steam is raised in enthalpy to a superheated level. Suitably, the system contains an independent reheater path from the HP turbine section to each of the LP turbine sections. Only one such path is shown in detail in FIG. 1, for clarity of illustration. However, as indicated, each LP turbine section may be fed from the HP turbine through a separate moisture separator and reheater path. Accordingly, the subsequent discussion of the reheater control system is directed to a single reheater steam flow path with the understanding that similar comments apply to the reheater path for each LP section.

At point 39, main turbine supply steam is diverted through a reheater valve RV, which is a suitable pneumatic-actuated valve which controllably allows passage of the main steam. The valve RV is preceded by a shut off valve so, which can be operated to prevent passage of main steam through to the reheater, and shunted by a conventional purge valve PV. Valve RV is actuated by a reheater valve actuator 50, which is a conventional electropneumatic transducer, designed to convert an electrical input signal into a pneumatic output signal. Actuator 50 is supplied from a regulated air pressure source (not shown) and produces an electrically controlled pneumatic output which is coupled to and causes the positioning of all reheater valves RV1-RVN, which in turn determine the amount of heating steam which passes to the reheater. The actuator 50 is controlled electrically from a master control system 90, the details of which are described hereinbelow.

The controlled steam flow through valve RV, comprising relatively dry heating steam derived from the main steam source, is passed through reheater 40. The reheater 40 is a conventional unit well known in the art, functionally adapted to transfer heat from the heating steam passing through reheater valve RV to the cycle steam which has been exhausted from the HP turbine. The reheater 40 may be single stage or double stage. The single stage reheater, as illustrated, typically receives its heating steam from the main stream line ahead of the turbine inlet throttle valve. On typical units with two stage reheat, the first stage reheater utilizes steam from a highest pressure HP turbine extraction point while the second stage reheat steam source is from the main steam lines ahead of the HP turbine inlet, as at point 39 in FIG. 1.

The heating steam which passes through the reheater gives up energy to raise the enthalpy of the turbine cycle steam and the heating steam becomes relatively wet and is passed out of the reheater as condensed water. With reference now to the cycle steam, water is drawn out of it by the moisture separator 35. The water thus drawn out of both the reheater 40 and the moisture separator 35 is piped back to a feed water heater system 37 wherein it is heated to a temperature suitable for reentry into the steam generator 18.

The superheated dry cycle steam which flows to the LP turbine sections from the reheater 40 at LP inlets gives up energy to meet turbine load and it ultimately emerges from the LP exhaust outlets. The exhaust steam is collected from each LP turbine section and passed through a condenser 70, the output water of which is passed through the pump 38 and thence to the feed water heater system 37.

With continued reference to FIG. 1, there is shown diagrammatically a series of temperature detectors 80-1 through 80-N corresponding to the plurality of LP turbine sections in the system. The temperature detectors are suitable thermocouples, or other equivalent temperature sensing devices, and are suitably mounted at each LP steam inlet, preferably to sense the metal temperature of stationary turbine structure at that point as caused by the reheated steam which is being introduced there. Each thermocouple (temperature) signal is connected through a transmission line (labeled T/C) to the control system 90, the plurality of T/C signals constituting feedback inputs to the control system, as well as representations of the turbine temperature variables which are ultimately controlled to restrict the amount of turbine metal thermal stress and generally to provide improved turbine power plant operation. As discussed hereinbelow, the control system 90 generates control signals which are connected to the actuators 50, thus controlling the degree of cycle steam reheating, and thus the temperature and other intermediately variable conditions of the steam entering the LP sections. More particularly, the conditions of the cycle flow steam, at the LP inlets are affected by 1) system operating determinants including cycle steam flow control applied by the controls 25 and the valves GV and TV at the HP inlet, the HP inlet steam throttle pressure and temperature and the operating load on the turbine system and 2) the operation of the moisture separator 35 and the reheater 40. As system operating determinants change with system operation to cause or tend to cause changes in the LP inlet steam conditions and the LP inlet metal structure temperature, changes are made in the reheater operation to cause the controlled LP inlet conditions to behave in the desired manner. Of course, some of the system operating determinants such as the steam throttle pressure and temperature are themselves independently controlled and such control accordingly affects the conditions of the cycle steam at the LP inlets. For example, a drop in the temperature of throttle steam can decrease the reheat capability. It is also noteworthy that the system operating determinants, such as the steam throttle pressure and temperature, have some effect on the heating capability of the heating steam in the reheater for any given position of the reheater valve. The T/C signals reflect what is happening to the steam temperature and to some indirect degree what is happening to other steam conditions at the LP inlets, and accordingly the T/C signals ultimately reflect the net impact of all interacting variables on the LP inlet steam conditions.

Also indicated diagrammatically in FIG. 1 is a mode control unit 95. The unit 95 provides operator determination of the particular mode of the plurality of automatic modes of control provided by the control system 90. The mode control may be computer controlled through the computer-controller 700, or it may be manually controlled through a pushbutton control panel. In the event that an operator desires to take over complete control of the system, as opposed to placing it in any one of the various available modes, an operator setting unit 650 is also provided.

As illustrated in FIG. 1, there are six modes of control preferably available in a system operated in accordance with this invention, and these modes can be set manually at any time by the operator. A seventh mode, namely the temperature limit mode, is entered into automatically by the system, in response to detection of an LP inlet temperature in excess of a predetermined temperature limit. When placed in this mode, the operator cannot put the system into any other mode of control until the highest LP inlet temperature has decreased to a second and lower predetermined limit. The preferred modes of control provide for improved plant, turbine and reheater operation and they are summarized in the following table:

TABLE I

CS (cold start)
 In the CS mode, the lift of the reheater control valves is controlled over a fixed period of time according to the programmed curve for cold turbine startups. In the preferred embodiment, the turbine inlets are raised linearly in temperature from 300°F to 500°F over a period of one hour.

T (maintain 400°F)
 In the T mode, the reheater control valves are automatically positioned so as to maintain the temperature at the hottest LP turbine inlet at 400°F after load reductions to 10 percent, or below, of rated output power, which reductions are to be held for periods exceeding 15 minutes. This control prevents the possibility of overheating the last two rotating rows of blades of the LP turbine section.

H (hot start)
 In the H mode, the reheater control valves are opened quickly to a point equivalent to an LP inlet temperature of 400°F, for hot turbine startups.

R (reset)
 In the reset mode, the reheater steam control valves are closed, ensuring a cold temperature at the LP inlets. The system is placed in reset after the turbine has been shut down for some length of time, and prior to a cold re-start.

M (manual)
 When in this mode, the reheater control valve positions can be controlled manually by an operator.

CP (computer)
When in the CP mode, the overall system is under the control of a computer-controller. In accordance with real time computer calculations, the computer actuates the control system into either the CS, T, H, or R, mode. The system may be placed into the taken out of the CP mode at any time by the operator.

TL (temperature limit)
 The control system is placed into the TL mode automatically in order to maintain an absolute high temperature limit to protect the LP turbines. When in the TL mode, all other modes are locked out except manual, manual being the only mode into which the operator can then place the system. The control system automatically returns to its prior mode of operation after the hottest turbine temperature is detected to have dropped by a predetermined amount.

It is understood that the system operator can change from one mode to another mode at his discretion (unless the temperature limit is exceeded). For example, if, while in the T mode, load is increased, the system may be placed in the CS mode at 35 percent load. The reheater valves will then open and increase the temperature of the LP inlet steam from 400°F to 500°F at a uniform rate.

Figure 2:
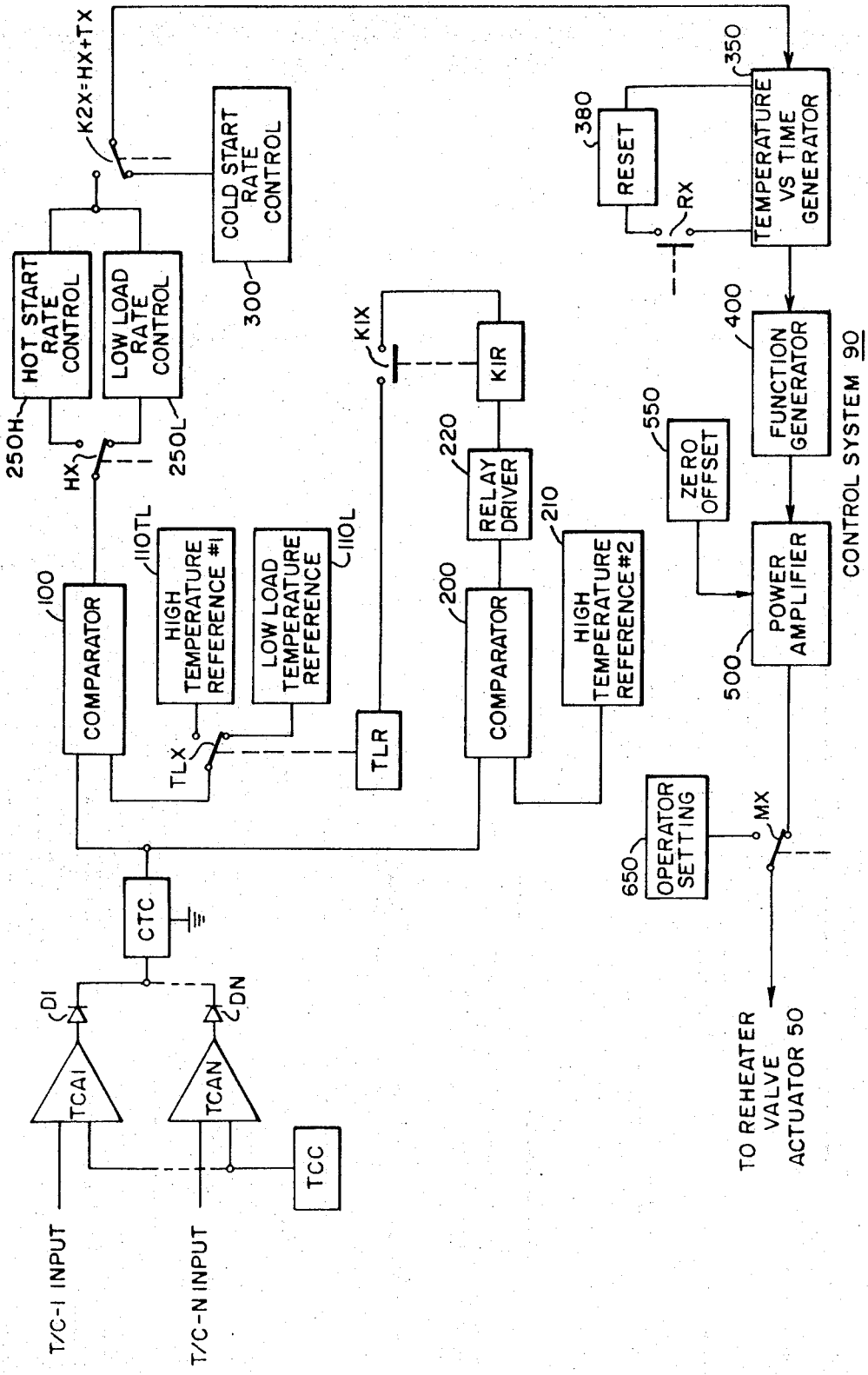
FIG. 2 shows a block diagram of an electronic control system operable with the nuclear power plant and turbine system shown in FIG. 1 and in accordance with the principles of this invention.

With reference now to FIG. 2, the preferred elements of the control system 90 are shown in block diagram form. The thermocouple inputs, designated T/C–1 through T/C–N, are shown connected to respective thermocouple amplifiers, designated as TCA–1 through TCA–N. Each thermocouple amplifier is a stable high gain proportional amplifier, utilizing an operational amplifier within an open loop gain on the order of $10^6$. Further, each thermocouple amplifier has differential inputs, with a second input connected to a thermocouple cold junction compensation unit which provides a controlled voltage level adapted to represent the voltage output of a cold thermocouple. Thus, the output of each thermocouple amplifier represents the increase in temperature, as sensed in its respective LP turbine section, over the cold state. In practice, the outputs of the thermocouple amplifiers are coupled to temperature indicators mounted on the main panel, to provide visual representation of the temperature at each LP inlet.

The output of a conventional auctioneering or CTC circuit represents the highest LP inlet temperature and it is processed by the control system 90 in either the H or T mode. In both the H and T modes, the reheater control valves are to be opened eventually to a position which provides heating steam flow resulting in an LP inlet temperature of 400°F at the hottest LP inlet.

The auctioneered temperature signal is connected to one of two inputs of the comparator 100. The other input circuit of the comparator 100 is normally connected to a low temperature reference 110L, which reference provides a reference voltage equivalent to an LP temperature of 400°F. The comparator 100 is a unity gain circuit which compares the auctioneered temperature input with the 400°F reference input, and produces an output signal which is positive or negative depending upon whether the sensed highest temperature is higher or lower than 400°F respectively. The output magnitude of the comparator 100 is proportional to the difference between the LP temperature signal and the temperature reference signal, and is thus a classic error signal as generated in feedback systems. It is to be noted, of course, that the temperature reference 110L may be adjusted to correspond to any other desired LP inlet temperature.

The output of the comparator 100 is coupled through a switch HX to either a low load rate control element 250L, or a hot start rate control element 250H. The element 250L is a large resistor, nominally of the order of 2 megohms, and is connected into the control circuit for operation in the T, or 400°F mode. The element 250H is a relatively small resistor, and is switched into the circuit corresponding to the mode H, or the hot start mode. The outputs of both 250L and 250H are connected to one of two input terminals of a two position switch K2X, which switchably connects the one input terminal to a ramp generator 350.

A cold start rate control circuit 300 provides a reference voltage which, when connected to the ramp generator 350 and a function generator 400 through the other input terminal of the switch K2X, causes operation of the reheater valves so as to produce the LP inlet temperature change shown in FIG. 4. In the cold start mode, the desired characteristic is a linear rise of temperature from 300°F to 500°F, taking place over a period of one hour. The signal provided by the circuit 300, when operated upon by the characteristics of the ramp generator 350, a function generator 400, and a power amplifier 500, causes the generation of an electrical output signal which produces an optimum approximation of the ideal LP inlet temperature versus time response shown in FIG. 4.

The temperature versus time generator, or ramp generator 350 is an operational amplifier connected in a well known manner to provide the mathematical function of an integrator. The slope of the output of generator 350, representing voltage versus time, is of course a function of the magnitude of the input signals, and thus varies depending upon the mode in which the control system is placed. The ramp output suitably extends from 0 volts to about −10.5 volts. A reset circuit 380, operated by a reset switch RX, provides capability for clamping the output level of the generator 350 to a predetermined minimum level, so as to place the reheater valves in a substantially closed position when in the reset mode.

It is noted that the positive voltage of the reference circuit 300 is designed to provide a linearly increasing ramp output, so as to provide a linear rise from 300°F to 500°F over the specified time interval. Additionally, a negative reference voltage, not shown, and of the same magnitude, may be switchably provided such that, when connected to the input of the generator 350, the generator output is reduced linearly, as from −10 volts to 0 volts. This reference would be used, for example, in the situation where the low pressure turbine temperature was at 500°F and it was desired to reduce it linearly to 300°F. It is noted that, in this situation, a conventional diode clamp circuit (not shown) is provided at the output of the ramp generator 350, to clamp the output at 0 volts and prevent the output from going to a positive value.

A function generator 400 comprises a diode-resistor logic network, which acts operationally as the input circuit of the power amplifier 500, and thereby controls the output of the amplifier 500 as a characterizing function of the output of the ramp generator 350. As is well understood in the art, the reheater valve actuator 50, which is an electropneumatic device, would ideally have a linear electrical/pneumatic characteristic. Similarly, the reheater valves themselves would ideally pass an amount of heating steam directly proportional to the valve lift. However, in practice, the overall characteristic of the reheater valve lift versus LP inlet temperature is non-linear, and is approximated by a straight line segment curve shown in FIG. 5. It is this approximation of the reheater characteristic which is achieved in a well known manner by the function generator 400.

The power amplifier 500 amplifies the output of the function generator 400 to a level sufficient to drive the reheater valve actuator 50. Coupled to the input of the amplifier 500 is a zero offset circuit 550, which holds the input to the amplifier at a minimum which yields an output of −1.0 volts with a zero ramp input, to satisfy live zero requirements of the reheater valves. At an output of −1.0 volts, the reheater valves are in a full closed position. It is to be remembered that in the present embodiment the actuator 50 drives each of the several reheater valves, such that the feedback control signal from the power amplifier 500 controls the inlet steam temperature of all the LP turbine sections. The maximum output of the power amplifier 500 is suitably clamped, by a conventional diode clamping circuit not shown, at approximately −9.5 volts.

When the system is placed in the manual mode, the switch MX connects the reheater valve actuator 50 directly to the conventional operator setting circuit 650, with which the operator may manually control the signal to the actuator 50, and thereby control the entire reheater system and the power plant as it is affected by the reheater operations.

With further reference to FIG. 2, the reference input to the comparator 100 is switchably connected to a high temperature reference No. 1, designated 110 TL, which supplies a voltage reference corresponding to an LP inlet temperature of typically 540°F. the auctioneered LP temperature signal is also coupled into the comparator 200, which comparator has a second input connected to a high temperature reference No. 2 (210), which is a voltage source corresponding to a predetermined high temperature limit, typically 550°F. When the auctioneered temperature signal exceeds the voltage of reference No. 2, corresponding to the situation where the hottest LP inlet temperature signal is in excess of the high temperature reference No. 2 signal, an output signal is derived from the comparator 200 which drives a relay driver 220, which in turn drives a relay KIR. The relay KIR causes a switch KIX to close, which in turn causes the energization of temperature limit relay TLR, which causes switching of a switch TLX. Thus, when the high temperature limit (reference No. 2) is exceeded, the input to the comparator 110 is switched from a low load temperature reference 110L to the high temperature reference No. 1. The high temperature reference No. 1 is set normally at 10°F below high temperature reference No. 2, such that, as soon as TLR is energized, the output of the comparator 100 becomes negative, causing the ramp generator to decrease in output, thereby tending to close the reheater control valves.

It is to be noted that the above-designated temperature references are arbitrary in level, and may be chosen to adapt to the particular system to which this invention is applied. The temperature references used herein are for illustrative purposes only, and the temperature differential between high temperature reference No. 1 and No. 2 may similarly be adapted to the specific system parameters. Comparator 200 has an off-on differential, suitably about 20°–30°F, such that an output from the comparator 200 is maintained until the auctioneered LP inlet temperature has dropped to 20°–30°F below the high temperature reference No. 2. Until this happens, the system is maintained in the TL mode, thus holding the hottest LP inlet at 10°F below high temperature reference No. 2 until the operator does something externally to cool off the LP turbines.

With reference now to FIG. 3, the circuit specifices of the preferred control system 90 are explained in more detail. The circuit temperature control CTC comprises a diode-resistor combination, the diode CTC-D being chosen for its temperature-voltage characteristics, which are such to substantially cancel out any signal variations caused by changes in the preceding circuitry. Resistors R96 and R97 are chosen to cooperate with the characteristics of the diodes CTC-D, and are suitably on the order of 3K each.

The comparator 100 comprises an operational amplifier A101, having an input R101 and being shunted by a resistor-diode network comprising R102, R103, D101, D102, D103, and D104. The shunting feedback network, with each of the diodes connected at T105 through R103 to ground, causes the polarity of an output of an amplifier A101 to depend upon whether the positive auctioneered temperature signal from the CTC circuit, or the negative temperature reference signal from the circuit 110, is greater in magnitude.

The reference circuit 110 comprises a negative voltage source which is connected to ground through a resistor 110L, a pot P111, and a variable resistor 110TL. The variable resistor 110TL is shunted by a normally closed switch TLX', such that the reference voltage is normally derived solely from the negative source, the resistor 110L and the pot 111 (suitably 2,000 ohms) providing a reference voltage corresponding to a temperature reference of about 400°F. When the switch TLX' is opened, corresponding to the detection of a temperature limit, the variable resistor 110TL is placed in series with the reference circuit, thereby raising the voltage sensed at the pot 111, and placing a higher temperature reference signal in connection with the input of an amplifier A101.

The comparator 200, having its input connected through R204 (suitably 499K) to the output of the compensating circuit CTC, comprises an operation amplifier A201 shunted by a resistor R202 (suitably 4.99 megohms) and capacitor C203 (suitably 0.0005 uf). Also connected to the input of A201 is a negative voltage reference (550°F) obtained from a pot P211 (suitably 2,000 ohms), a variable terminal of a pot P211 being connected to an input of A201 through R212 (suitably 4.99 megohms). Thus, the input to the amplifier A201 is the sum of the LP inlet temperature signal and the 550°F reference signal. As long as the input signal is of a value corresponding to a temperature below 550°F, the output of the circuit 200 is positive. This positive signal is coupled to a transistor TR200 or relay driver 220, holding it in an off-biased condition. However, as soon as the LP inlet temperature signal rises to a value representing a temperature greater than 550°F the output of the comparator 200 goes negative, turning on the transistor TR220. The collector of TR220 is coupled through a resistor R225 (75 ohms) to the relay KIR which has its other terminal connected to a negative voltage source. The relay KIR is shunted by an arc suppression diode DK1. Thus, when the transistor 220 is biased on, the series circuit between the negative supply and ground is closed, whereby the relay KIR is energized and the switch KIX is closed (see FIG. 6). The closing of the switch KIX places a voltage directly across the temperature limit relay TLR, thus energizing it and opening the normally closed switch TLX'. Simultaneously with the energization of the relay TLR, a high temperature light TLL, in parallel with the relay TLR (see FIG. 6) is lighted, informing the operator of the condition of the system. As stated hereinabove, the relay KIR will remain energized, keeping the system in the TL mode, until the operator takes action to manually reduce the temperature of the hottest LP inlet, or until for any other reason such inlet drops to a temperature approximately 20°-30°F below the 550°F reference point.

With further reference to FIG. 3, the rate control circuit 250 comprises parallel branches, the lower branch 250L having a high resistance (suitably 2 megohms), and the upper branch having a relatively low resistance (suitably 100K). As is well known in the pertaining art, the gain characteristic of an operation amplifier connected to integrate the input signal carries a proportionally constant K which is inverse to the input resistor. Thus, the two meg resistor designated 250L corresponds to a ten minute rate, and is used in the T (400°F) mode to produce a ramp generator output which achieves an LP inlet temperature of about 400°F in about ten minutes. Correspondingly, in the H (hot start) mode, wherein the switch HX is closed, the input resistance is appreciably 100K, increasing the gain of the ramp generator accordingly, and causing the LP inlet temperature to attain approximately 400°F in about 30 seconds. It is, of course, noted that the switch K2X must be closed by the mode control 95 to couple either the 250H or 250L resistor to the ramp generator 350.

The cold start rate control circuit 300 comprises a positive reference voltage which is connected to ground through a resistor R301 (suitably 2430 ohms) in series with a pot P302 (suitably 50 ohms). The output from the pot P302 is coupled through a resistor R303 (suitably 10 megohms) to one terminal of the switch K2X. When in the CS mode, the switch K2X is positioned as shown in FIG. 3, coupling a positive voltage through to the ramp generator 350. The positive voltage continuously applied to the ramp generator 350 causes the generation of a negative-going ramp output from the generator 350, from substantially 0 volts to −10 volts. This negative-going ramp corresonds in value to that desired to raise the LP inlet temperature from 300°F to 500°F in about one hour. By changing the value of the resistor R303, the ramp time can be changed as desired. The ramp generator 350 is a conventional operational amplifier with a feedback capacitor C352 (suitably 5 uf), and thus functions as an integrator. By switching the small resistor R381 (20K) in parallel with the capacitor C352, as done when a reset switch RX is closed, the capacitor C352 is discharged and the output of the ramp generator is held essentially at zero.

The function generator 400 comprises the input circuit which is operatively connected to an operational amplifier A501. As is well known in the art, the gain characteristic of an operational amplifier is proportional to $R_f$ (feedback resistor) over $R_{in}$, the input resistance, with $R_{in}$ here being established by the diode-resistor network. Also connected to an input of the amplifier A501 is a zero offset circuit 550, comprising a negative voltage connected through a pot P551 (5,000 ohms) and a resistor R552 (7.5 megohms). Thus, when the output of the ramp generator is below a given minimum, the zero offset circuit provides a minimum negative signal at the input of the amplifier A501. This minimum signal corresponds to a point one on the straight line graph of FIG. 5, and establishes a live zero signal which is required by the reheater valve actuator 50.

Referring to both FIGS. 4 and 5, the desired variation of reheated steam temperature with time is shown in FIG. 4. However, the relationship between the control signal applied to actuator 50, and the temperature of the turbine cycle steam after being heated in the reheater, is not a linear arc relationship, but is approximately by the straight line segment curve shown in FIG. 5. Thus, in order to obtain the approximately linear response as shown in FIG. 4, it is necessary that the output of the ramp generator 350 be modified so that, corresponding to a continuously rising ramp signal, the control signal has the straight line segment form of the curve of FIG. 5. This is accomplished by the function generator 400.

Comparing the function generator circuitry as shown in a block 400 with the straight line segment graph of FIG. 5, it is seen that break points 2 and 3 may be positioned by the setting of pots P402 and P403 respectively. The pot P402 is connected through a resistor R404 to a positive voltage source, and the wiper of the pot P402 is connected through a resistor R406 to a terminal point T402. The terminal point T402 is connected respectively to the cathode of a diode D402, and to a resistor R402 which buffers the point T402 from the input to the function generator. Thus, the voltage at the point T402, determined by the setting of the pot P402, is normally held positive with respect to the anode of the diode D402, which is coupled to the zero offset circuit 550. Under these circumstances, the diode D402 is back biased until the output of the ramp generator 350 becomes sufficiently negative to cause the point T402 to be negative with respect to the anode of the diode D402, thus turning it on. At that time, the input resistance to the operational amplifier A501 becomes appreciably resistor R402 in parallel with resistor R401, thus increasing the gain of the amplifier, as reflected by the increased slope between the break points 2 and 3. In a similar fashion, the wiper of a pot 403 is tied through a resistor R405 to a terminal T403. The terminal T403 is connected through a resistor R403 to the input of the function generator, and to the cathode of a diode D403. The anode of the diode D403 is connected to the anode of the diode D402 and to the input of the operational amplifier A501. The setting of the pot P403 is chosen so that the output of the generator 350 must increase to a greater negative voltage before the diode D403 is forward biased. This occurs at a break point 3, at which point a resistor R403 is effectively shunted across the resistors R401 and R402, further decreasing the input resistance to the amplifier A501, and resulting in the increase slope as indicated between a break point 4 and the point 3. The point 4 corresponds to the point where the output of the ramp generator has risen to −10 volts, and at which the magnitude of the signal transmitted to reheater valve actuator 50 causes substantially a 100 percent valve lift, resulting in maximum flow of steam through the reheater valves to the reheaters.

The power amplifier 500 comprises the operational amplifier A503, the output of which is fed through an emitter follower (comprises TR500, R502 and R503) to derive a control signal suitable for transmission to the actuator unit 50. The output of the emitter follower is switchably connected through the switch MX to the actuator 50. When the switch MX is closed, corresponding to manual operation, the operator can adjust a potentiometer P642 (250 ohms), which is connected in series with a resistor R651 (100 ohms) between a positive voltage source and ground. By adjusting the pot P652, the operator can directly control the voltage which is transmitted to the valve actuator 50. This is done if there is a breakdown in the electronic control circuitry, or for any other reason the operator wishes to take manual control of the system.

Figure 6:
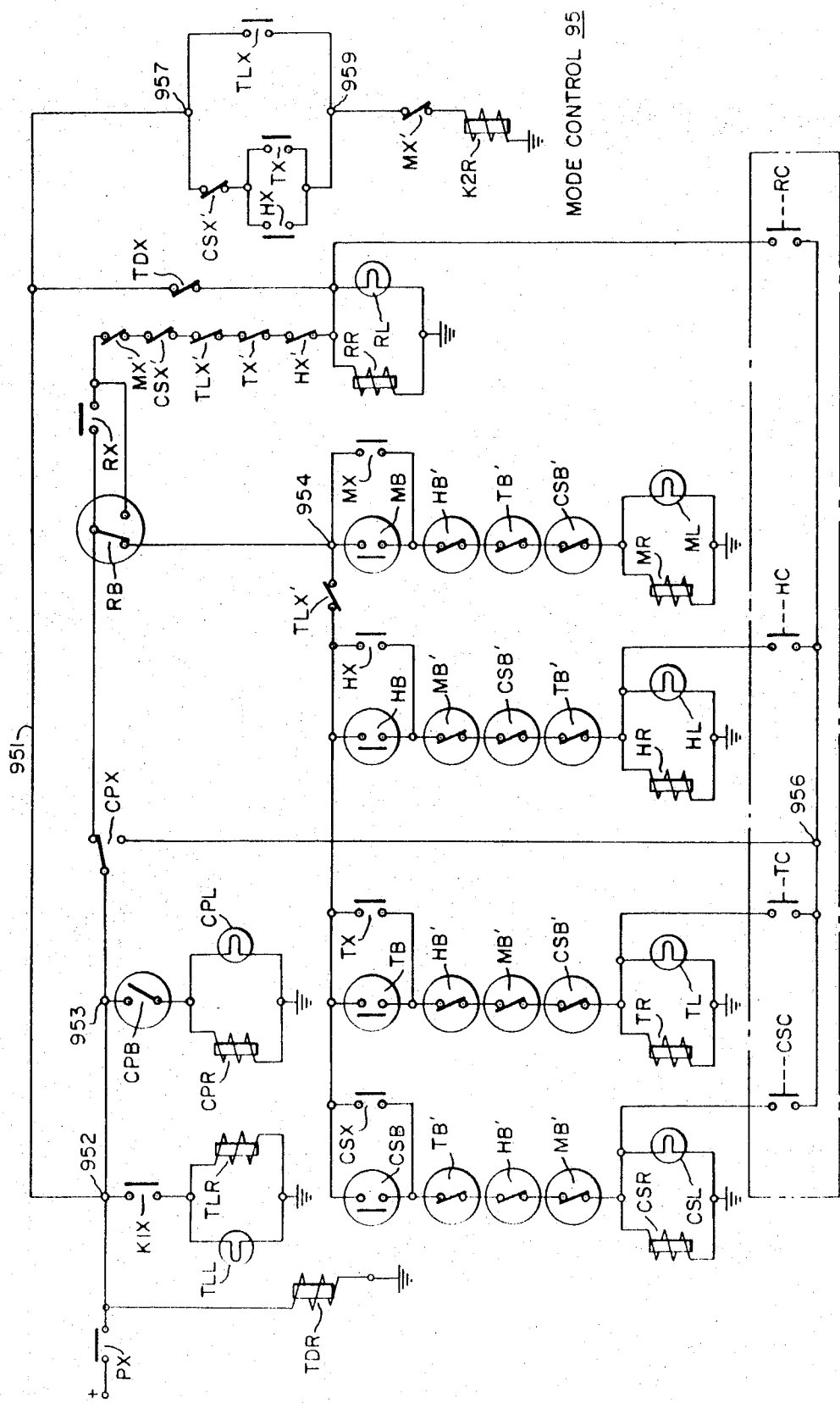
FIG. 6 shows a schematic diagram of a mode control unit employed in the control system.

Referring now to FIG. 6, the schematic diagram of the manual or computer operated mode by a control unit 95 is shown. Power is provided to the control unit by closing the switch PX and transmitting regulated positive voltage to a point 952. Upon closing the switch PX, a time delay relay TDR, connected between the point 952 and ground, is energized. The relay TDR has the operating characteristic of operating after a short time delay, on the order of 5 seconds, after which delay a normally closed switch TDX is caused to open. The switch TDX is connected to the point 952 through a line 951, and causes energization of a reset relay RR at the time that the switch PX is first closed. Energization of the relay RR causes the closing of a switch RX, which connects the relay RR to the point 952 through normally closed switches CPX, MX', CSX', TLX', TX' and HX'. Consequently, when switch TDX opens after the short time delay, the reset relay RR is held energized through the switch RX, causing the system to turn on in the reset mode of operation. This is done in order to allow sufficient time for the power supply and the amplifiers to stabilize. In the absence of this provision for automatically placing the control system in the reset mode, the system could settle out in any given mode, which could be harmful to the turbines if not quickly caught by the operator.

It is also noted that the operator may, at any time, place the system in the reset mode by a switching switch RB, the common terminal of which is connected to the terminal 952 through a normally closed switch CPX. Upon switching the switch RB, power is provided to the reset relay RR, which holds itself energized after the switch RB is released to its normal position. As discussed hereinabove and as illustrated in FIG. 3, the closing of the switch RX also clamps the output of the function generator 350 substantially to zero, holding the valve control signal at the live zero level shown in FIG. 5.

As is seen in FIG. 6, each of the modes CS, T, H and M has a corresponding mode selector button, being CSB, TB, HB and MB respectively. These buttons, along with CPB and RB, are displayed prominently on the system control panel. The buttons are shunted by corresponding switches SCX, TX, HX and MX respectively, which act to hold the respective mode control relays operating after the companion button has been released. With the reset button RB in its normal position as shown, power is supplied through to the point 954, and is connected from there to each of the four control buttons as long as the temperature limit relay TLR is not energized. If the relay TLR is energized, the switch TLX', connected to the point 954 is caused to open, such that no power can get through to the control relays for the CS, T, and H modes. However, under these circumstances, the operator can place the system in manual control, by pressing a button MB, which is in series with the manual relay MR, which when activated closes the switch MX.

Each of the four control buttons is placed in series with three normally closed switches corresponding to the three other control buttons. Thus, button CSB is in series with the normally closed switches TB', HB', and MB'all of which are in series with the cold start relay CRS. Thus, only when the system is in none of the other three modes is power transmitter through the switch CSX and the relay CSR to ground, so as to energize the SCR relay and place the system in the cold start mode. Correspondingly, the buttons TB, HB, and MB are connected between the point 954 and corresponding mode relays TR, HR, and MR through three normally closed switches in series, each of which is energized by one of the other three mode relays. By this scheme, the system is placed in only one of the four modes (CS, T, H, and M) at a time. Panel lights CSL, TL, HL, and ML shunt relays CSR, TR and MR respectively, to indicate the mode of the system.

The line 951 carries power to the point 957, which is tied through parallel paths to a point 959, and from the point 959 through the normally closed switch MX' to and through the relay K2R to ground. A first parallel path between the point 957 and the point 959 contains the normally open switch TLX, which is closed only when the temperature limit is exceeded. When the switch TLX is closed, and the control system is not in manual mode, the relay K2R is energized, causing switching of the switch K2X which is illustrated in FIG. 2. Under these circumstances, high temperature reference No. 1 is connected through to the comparator 100, and the system is stabilized at a high temperature (suitably 540°F) until the operator manually brings it to a lower temperature. The second parallel path between the point 957 and the point 959 comprises a normally closed switch CSX' (which opens when the relay CSR is energized) in series with the parallel configuration of the switches HX and TX, both normally open. Thus, when the computer is not in the CS mode, and is placed in either the H or T mode, power is connected through to the relay K2R, causing switching of K2X (as shown in FIG. 2), whereupon the low load temperature reference 110L is connected to comparator 110.

The button CPB, the computer mode button, is connected in series with the relay CPR, between the point 953 and ground. Light CPL shunts the relay CPR, to give visual indication of when the system is in the computer control mode. Upon closing of the button CPB, the relay CPR is energized, causing switch CPX to switch and transfer power to the point 956 shown illustrated within a computer contacts unit 955. The point 956 is connected to the computer controller 700, (FIG. 1), and when it is energized, power is prevented from being connected to any of the other mode switches (due to the position of CPX), such that only the computer has control of the system. Point 956 may be physically connected to the computer, or may be any terminal point which is in turn electrically connected to the computer so as to give it control.

As seen in FIG. 1, a plurality of data inputs are provided into computer controller 700, representing information monitored from throughout the system. For example, the pressure in each of the turbine sections is monitored at a specific point, and may be converted through suitable transducers into signals which are transmitted to computer controller 700. In a similar fashion, a representation of the megawatt generation of MW of generator 12 is fed into computer controller 700.

In the preferred embodiment an analog computer is included in the computer controller 700. A digital computer would form another embodiment.

The operation of the system in each of the aforementioned control modes can now be understood, in view of the description above. When the system is placed in the CS (cold start) mode, switch CX is closed, and power is transmitted through the switches PX, CPX, RB, TLX', TD'HP', and MB' to relay CSR. With relay CSR energized, all other modes are deenergized, and the voltage reference provided by the unit 300 is connected straight through to the ramp generator 350. The 10 meg resistor of the circuit 300, in combination with the feedback capacitor of the generator 350, combine to produce a ramp output adapted to cause valve lift over a period of about 60 minutes, carrying the LP inlets from a temperature of about 300°F to 500°F.

When placed in the T mode, the relay TR is energized, thus closing the switch TX and connecting the output of the comparator 100 to ramp generator 350 through the low load rate control circuit 250L. Unless or until the temperature limit (as provided by high temperature reference 210) is exceeded, the low load temperature reference 110L (400°F) is connected as an input to the comparator 100 along with the auctioneered highest LP inlet temperature signal. The comparator 100 thus continuously provides an error signal, holding the highest LP inlet temperature at 400° ± 25°F.

In the H (hot start) mode, a switch HX is closed, and the output of the comparator 100 is connected to the ramp generator 350 through the hot start rate control circuit 250H. By switching the relatively low resistance (about 100K) of the circuit 250H into the input connected to the generator 350, the generator output builds up much quicker, i.e. in about 30 seconds. Thus, the temperature of the highest LP inlet raises to the 400°F reference quickly, at which point the control is essentially the same as that of the T mode.

As set forth hereinabove, when the system is placed in the reset mode, the switch TX is closed, and the system is incapable of going into the CS, T, H, or M modes. With the switch RX closed, the output of the ramp generator is held appreciably at zero, such that the control signal which is communicated to the actuator 50 is provided essentially by the zero offset circuit 550, which is designed to maintain the temperature at about 300°F.

From the above description, it is seen that this invention provides an efficient means and method for carrying out the objectives as previously stated. The electronic circuitry is entirely solid state, and the miniaturization enables remote placement of the electronic control circuitry as well as the control panel which carries the various mode buttons, temperature indicators, etc. The electronic circuitry as described contains components selected specifically for reliability and stability. In operation, the apparatus of this invention provides efficient and reliable control of the reheating process, with a substantial reduction in required operator time, and with resulting increased efficiency of performance of the overall turbine system due to more reliable temperature control.

I claim:
1. A reheater control system for a reheater system in a steam turbine generating system comprising:
   control means having,
   temperature reference means,
   means for detecting temperature,
   comparator means,
   means for generating a ramp,
   means for generating a function having an input connected to an output of said ramp generator means,
   means for valving a flow of steam through said reheater system,
   means for moving said reheater valving means from one position to another,
   an output of said function generator means connected to an input for said moving means, whereby said moving means is controlled by a signal from said function generator means,
   said function generator means having transfer characteristics matched with the input/output characteristics of said valving means, such that, said valving means is opened in a manner producing a substantially linear increase of inlet pressure with time when an output of said temperature reference means is connected to an input of said ramp generator means.

2. The reheater control system as defined in claim 2 including,
  load control means adapted for placing said control means in a plurality of modes.

3. The reheater control system as defined in claim 2 including computer means for automatically switching said control means from one mode to another.

4. The reheater control system as defined in claim 2 wherein said plurality of modes includes a first mode adapted to control said means for moving said reheater valving means over a fixed period of time so as to vary the temperature substantially linearly at a low pressure inlet to said steam turbine generating system from a first predetermined temperature to a second predetermined temperature, over a predetermined period of time.

5. The reheater control system as defined in claim 4 including computer means for automatically switching said control means from one mode to another.

6. The reheater control system as defined in claim 4 wherein said control means has a second mode adapted to maintain a temperature at the hottest low pressure turbine inlet at a predetermined temperature.

7. The reheater control system as defined in claim 6 including computer means for automatically switching said control means from one mode to another.

8. The reheater control system as defined in claim 6 wherein said temperature detection means comprises thermocouple sensor means at the low pressure inlets of said steam turbine generating system, said thermocouple sensor means generating signals representing temperatures at said inlets, and having auctioneering diode logic means for providing an electrical signal representative of the highest detected inlet temperature.

9. The reheater control system as defined in claim 8 including computer means for automatically switching said control means from one mode to another.

10. The reheater control system as defined in claim 8 wherein said control means has a third mode adapted to bring heating steam quickly to a level corresponding to a predetermined low pressure inlet temperature.

11. In a turbine system for generating electrical energy, having at least one high pressure turbine and a plurality of low pressure turbines driven by steam from a nuclear powered steam source, a reheater system for reheating cycle steam which is passed through said at least one high pressure turbine before it is passed into and through one of said low pressure turbines, comprising:
  a. reheater means, receiving heating steam from said steam source for reheating relatively wet cycle steam from said at least one high pressure turbine and producing superheated and relatively dry steam suitable for passage to one of said low pressure turbines;
  b. temperature detection means, for detecting the turbine temperatures near the steam inlets of said low pressure turbines, and generating signals representing said turbine temperatures;
  c. reheater control means, receiving said signals, and having logic for deriving that one of said signals representing the highest of said temperatures, comparator circuitry for comparing said one signal with a temperature reference signal, and a plurality of control modes in each of which the amount of heating steam passing through said reheater means is controlled according to a separate predetermined function; and
  d. mode control means, adapted for placing said control means in one of said plurality of modes.

12. The reheater system as described in claim 11 wherein said mode control means is switchably connected to programmable computer means for continuously calculating the desired mode of control of said reheater control means, and comprising a data network for continuously monitoring physical operating parameters in said low pressure sections of said turbine and for transmitting to said computer means data representing said monitored parameters.

13. The reheater system as described in claim 11, wherein said reheater control means has a first mode adapted to control said heating steam over a fixed period of time so as to vary the temperature at said low pressure inlets from a first predetermined temperature substantially linearly to a second predetermined temperature, over a predetermined time period.

14. The apparatus as described in claim 13 wherein said reheater control means has a second mode adapted to maintain the temperature of the hottest low pressure turbine inlet at a predetermined temperature.

15. The apparatus as described in claim 1, wherein said temperature detection means comprises thermocouple sensors at each of said lower pressure inlets, thermocouple amplifiers connected to an amplifying the signals from each of said thermocouples, and having auctioneering diode logic means for providing an electrical signal representative of the highest detected inlet temperature.

16. The apparatus as described in claim 13, wherein said reheater control means has a third mode adapted to bring said heating steam quickly to a level corresponding to a predetermined low pressure inlet temperature.

17. The reheater system as described in claim 1 wherein said reheater control means comprises a switching circuit operatively connected to said comparator circuit, said switching circuit operatively connected to said mode control means to hold said reheater control means in a temperature limit mode and out of all other of said plurality of modes when said highest temperature exceeds said reference temperature.

18. In a nuclear powered turbine system, having at least one high pressure turbine and at least one low pressure turbine, with steam generated in a steam generator being first passed through said at least one high pressure turbine and exhausted therefrom, and then passed into said at least one low pressure turbine, with a reheater interposed between said high pressure turbine and said low pressure turbine for reheating the exhausted and relatively wet steam from said high pressure turbine and to produce superheated and relatively dried steam for passage to said low pressure turbine, said rehater deriving its heating energy from relatively dry reheating steam obtained directly from said steam generator, the amount of said reheating steam being controlled by a pneumatically operated reheater valve positioned between said steam generator and said reheater, said valve being controlled by an electropneumatic transducer which produces output pneumatic signals connected to said reheater valve in response to an input electric signal and having a generally non-linear transfer function, a control system for generating said input electric signal comprising:
   a. a ramp generator for producing a ramp signal rising substantially linearly with time;
   b. a function generator, connected to the output of said ramp generator, and having a diode-resistor logic network characterized by a plurality of set points;
   c. a power amplifier, including an operation amplifier having said function generator connected to its output, said electric signal appearing at the output of said amplifier;
   d. said function generator cooperating with said power amplifier to provide a straight line-type gain characteristic;
   e. at least one reference source providing a reference signal switchably connected to said ramp generator, so that when so connected the output of said power amplifier varies in time in a non-linear manner designed to compensate for the non-linear characteristic of the transducer so as to cause a substantially linear rise in temperature of the reheated steam with time; and
   f. a zero offset circuit having an output connected to the input of said power amplifier, for producing a live zero output when said reference source is not connected to said ramp generator.

19. The system as described in claim 18, wherein said turbine system comprises a plurality of low pressure turbine sections, with a reheater interposed between said high pressure turbine and each of said low pressure sections, with reheater valves positioned in the reheating system path of each of said reheaters, said valves being commonly controlled by said transducer, and comprising:
   a. thermocouple means placed in each of said low pressure sections, for generating temperature signals representing the temperatures of said sections;
   b. auctioneering means, for auctioneering that temperature signal representing the highest of said section temperatures;
   c. a first temperature reference source providing a first temperature reference signal;
   d. comparator means, having said auctioneered signal connected to its input, for comparing two input signals and providing a comparator signal;
   e. first switch means, for normally connecting said first temperature reference signal to said comparator means input; and
   f. second switch means, switchably connecting said comparator signal and said reference signal to said ramp generator.

20. The system as described in claim 19, comprising:
   a. temperature limit switching circuitry, having said auctioneered signal connected to its input;
   b. a second temperature reference source providing a second temperature reference signal; and
   c. said temperature limit switching circuitry operatively connected to said first switch means to cause it to switch said second temperature reference signal into connection with said comparator means input when said auctioneered temperature exceeds a predetermined limit, whereby said comparator signal is of a polarity and magnitude that said amplifier signal causes said reheater valves to close and reduce the amount of reheating steam obtained by said reheaters.

21. The apparatus as described in claim 20, comprising mode control means, adapted to switchably place said control system into one of a plurality of modes of control, in each of which the amount of heating steam passing through said reheaters is automatically controlled in a separate predetermined manner.

22. The apparatus as described in claim 21, wherein said temperature limit switching circuitry is operatively connected to said mode control means to hold said control system out of any of said plurality of modes of control when said auctioneered temperature exceeds said predetermined limit and thereafter until it drops to a second predetermined limit.

23. In a turbine system, having a controllable reheater for reheating steam passed from a high pressure turbine to a low pressure turbine, a control system having an output connected to said reheater for controlling the operation of said reheater so as to control the temperature of the steam passed to said low pressure turbine and accordingly the turbine temperature at the inlet where said reheated steam is received, comprising:
   a. cold start means for generating a cold start control signal when said control system is switched into a cold start mode, for controlling said reheater over a fixed period of time so as to raise said low pressure turbine inlet temperature from a first predetermined temperature to a second predetermined temperature over a predetermined time period;
   b. constant temperature means, for generating a constant temperature control signal when said control means is switched into a constant temperature mode, said constant temperature signal automatically maintaining the temperature at said low pressure turbine inlet at a predetermined temperature;
   c. hot start means, for generating a hot start control signal to quickly raise said low pressure turbine inlet to a predetermined temperature when said control system is switched into a hot start mode;
   d. reset means, for generating a reset control signal to maintain said low pressure turbine inlet at a low temperature when said control system is switched into a reset mode;
   e. manual control means, adapted so that said control system output can be manually determined when said control system is switched into a manual mode;
   f. control mode means for switchably connecting said control system into one of said modes; and
   g. ramp generator means operatively connected as a part of said cold start means when in said cold start mode, as a part of said constant temperature means when in said constant temperature mode, and said hot start means when in said hot start mode.

24. The control system as described in claim 23 wherein the input of said ramp generator is connected to a constant signal source when said system is in the cold start mode.

25. The control system as described in claim 24 wherein the input of said ramp generator is connected to a fast rise time network when said system is in the hot start mode.

26. The control system as described in claim 25 wherein said ramp generator comprises an operational amplifier.

27. The control system as described in claim 26 wherein the output of said ramp generator is connected to a power amplifier through a function generator, said function generator having a plurality of break points so that when said ramp generator produces a substantially linear ramp output, said power amplifier produces a non-linear output signal.

28. The control system as described in claim 27 wherein said controllable reheater comprises a pneumatically operated reheater valve and a heat-transfer reheater unit, said reheater valve controllably passing said reheating steam to said reheater unit, and an electropneumatic transducer which actuates said valve, the output of said power amplifier being connected to said transducer.

29. The apparatus as described in claim 28 wherein said transducer has a non-linear transfer characteristic, and said function generator combines with said transducer to provide a substantially linear overall control characteristic.

30. The method of operation of a steam turbine system, which system comprises a high pressure turbine section and at least one low pressure turbine section, comprising:
   a. communicating relatively hot and dry steam to said high pressure turbine section, for driving same;
   b. exhausting relatively cool and wet steam, from which said high pressure turbine section has taken energy, from said high pressure turbine section;
   c. reheating said relatively wet steam by bringing it into heat transfer contact with a controlled flow of heating steam;
   d. communicating said reheated steam to an inlet of said low pressure turbine section, for driving said low pressure turbine section;
   e. driving an electric generator from said high pressure and low pressure turbine sections, to generate electrical power;
   f. monitoring the temperature at said low pressure inlet, and generating an electrical temperature signal representing said low pressure section temperature;
   g. automatically and continuously generating a continuous control signal according to one of a plurality of control modes and operatively controlling said controlled flow of heating steam with said control signal when said temperature signal is below a predetermined minimum level, generating the control signal comprises generating a first portion of said signal which rises in magnitude substantially linearly with time at a first predetermined rate, a second portion of said signal continuous with said first portion, and which rises linearly with time at a second and greater predetermined rate, and a third portion continuous with said second portion, rising in magnitude with time at a third and greater predetermined rate, said control signal comrpising in time said three portions, and operatively controlling said flow of heating steam to cause said low pressure turbine section temperature to rise substantially linearly; and
   h. choosing said one of a plurality of control modes, thereby controlling the step of reheating and correspondingly controlling the temperature of said at least one low pressure turbine section.

31. The method as described in claim 30 comprises controlling said flow of heating steam over a fixed period of time so as to raise the temperature at said low pressure inlet from a first predetermined temperature substantially linearly to a second predetermined temperature, and over a predetermined time period.

32. The method as described in claim 31 wherein said first predetermined temperature is about 300°F, said second predetermined temperature is about 500°F, and said predetermined time period is approximately one hour.

33. The method as described in claim 30, comprising maintaining said inlet temperature within ± 2.5°F of a fixed temperature.

34. The method as described in claim 30 comprising simultaneously initiating control of said heating steam and limiting said control signal to a reset level.

35. The method as described in claim 30 comprising automatically choosing the control mode of operation as a function of analysis of the turbine system operation made by a computer.

36. The method as described in claim 30 wherein said turbine system comprises at least two low pressure turbine sections, and comprising the step of sensing the temperature at the steam inlet of each of said low pressure sections and generating temperature signals corresponding to said sensed temperatures, and auctioneering said temperature signals to derive an auctioneered signal representing the highest of said temperatures.

37. In an electronic reheater control system for a steam turbine generating system, for controlling the reheating of steam which is cycled from a high pressure section of said turbine to a low pressure section of said turbine, wherein said reheating steam is controllably passed by a reheater valve, which valve is controlled by a transducer having a non-linear transfer characteristic, the method comprising:
   a. continuously generating an electric signal which is a non-linear function of the desired low pressure turbine temperature, and which compensates for said non-linear transducer characteristic;
   b. connecting said electrical signal to said transducer, and generating a pneumatic signal;
   c. connecting said pneumatic signal to said reheater control valve, thereby controlling the passage of reheating steam;
   d. measuring the temperature at the inlet of said low pressure turbine section, and generating an electric temperature signal representing said measured temperature;
   e. comparing said measured temperature signal with a temperature reference signal;
   f. generating a temperature-error signal as a function of said temperature comparison; and
   g. generating said control signal as a function of said temperature-error signal.

38. The method as described in claim 37 wherein said temperature reference signal represents a temperature limit, and comprising the steps of:
   a. comparing said measured temperature signal with a second reference signal representing a temperature lower than said temperature limit by a fixed amount; and
   b. generating a temperature-error signal such that, said control signal causes said low pressure temperature to be reduced to and maintained at said lower temperature.

* * * * *